United States Patent
Asal

(10) Patent No.: US 8,893,432 B2
(45) Date of Patent: Nov. 25, 2014

(54) WATERING DEVICE

(75) Inventor: Benjamin Asal, Erbach-Ersingen (DE)

(73) Assignee: Husqvarna AB, Huskvarna (SE)

( * ) Notice: Subject to any disclaimer, the term of this patent is extended or adjusted under 35 U.S.C. 154(b) by 0 days.

(21) Appl. No.: 14/128,227

(22) PCT Filed: Nov. 16, 2011

(86) PCT No.: PCT/EP2011/070295
§ 371 (c)(1),
(2), (4) Date: Dec. 20, 2013

(87) PCT Pub. No.: WO2013/071968
PCT Pub. Date: May 23, 2013

(65) Prior Publication Data
US 2014/0123557 A1 May 8, 2014

(51) Int. Cl.
*A01G 27/04* (2006.01)
*A01G 27/00* (2006.01)
*A01G 27/06* (2006.01)
*A01G 29/00* (2006.01)

(52) U.S. Cl.
CPC .............. *A01G 27/006* (2013.01); *A01G 27/06* (2013.01); *A01G 29/00* (2013.01)
USPC .......................................................... 47/81

(58) Field of Classification Search
USPC ............... 47/81, 79, 80, 48.5, 71, 65.5, 66.6, 47/66.7, 39, 67, 68; 239/145, 547; 222/187
See application file for complete search history.

(56) References Cited

U.S. PATENT DOCUMENTS

| | | | |
|---|---|---|---|
| 2,799,121 A | | 7/1957 | Modeweg |
| 2,810,235 A | * | 10/1957 | Magid .............................. 47/81 |
| 3,049,834 A | | 8/1962 | Heath |
| 3,069,807 A | | 12/1962 | Wall |

(Continued)

FOREIGN PATENT DOCUMENTS

| | | |
|---|---|---|
| DE | 1030096 B | 5/1958 |
| DE | 1064281 B | 8/1959 |
| DE | 1912083 A1 | 9/1970 |
| GB | 2198324 A | 6/1988 |

OTHER PUBLICATIONS

International Search Report of PCT/EP2011/070295 mailed Aug. 24, 2012.
Written Opinion of PCT/EP2011/070295 mailed Aug. 24, 2012.

(Continued)

*Primary Examiner* — Trinh Nguyen
(74) *Attorney, Agent, or Firm* — Nelson Mullins Riley & Scarborough LLP

(57) ABSTRACT

A watering device for potted plants with a water storage device and a water transporting line having a fiber strand which operates by capillary action includes a storage tank, a lid arrangement, a duct and a retaining device. The storage tank opens toward the top. The lid arrangement closes the storage tank in a removable manner. The duct for the water transporting line is formed on the water storage device. The retaining device protrudes downward into the storage tank in the assembled state and guides a section of the fiber strand in a bottom area of the storage tank. A fixing element for fixing the water transporting line in a tension-proof manner is provided on the lid arrangement. The fixing element is arranged on a side of the retaining device which faces away from the duct and is designed for fixing the fiber strand.

8 Claims, 2 Drawing Sheets

(56) References Cited

U.S. PATENT DOCUMENTS

Figure 1:
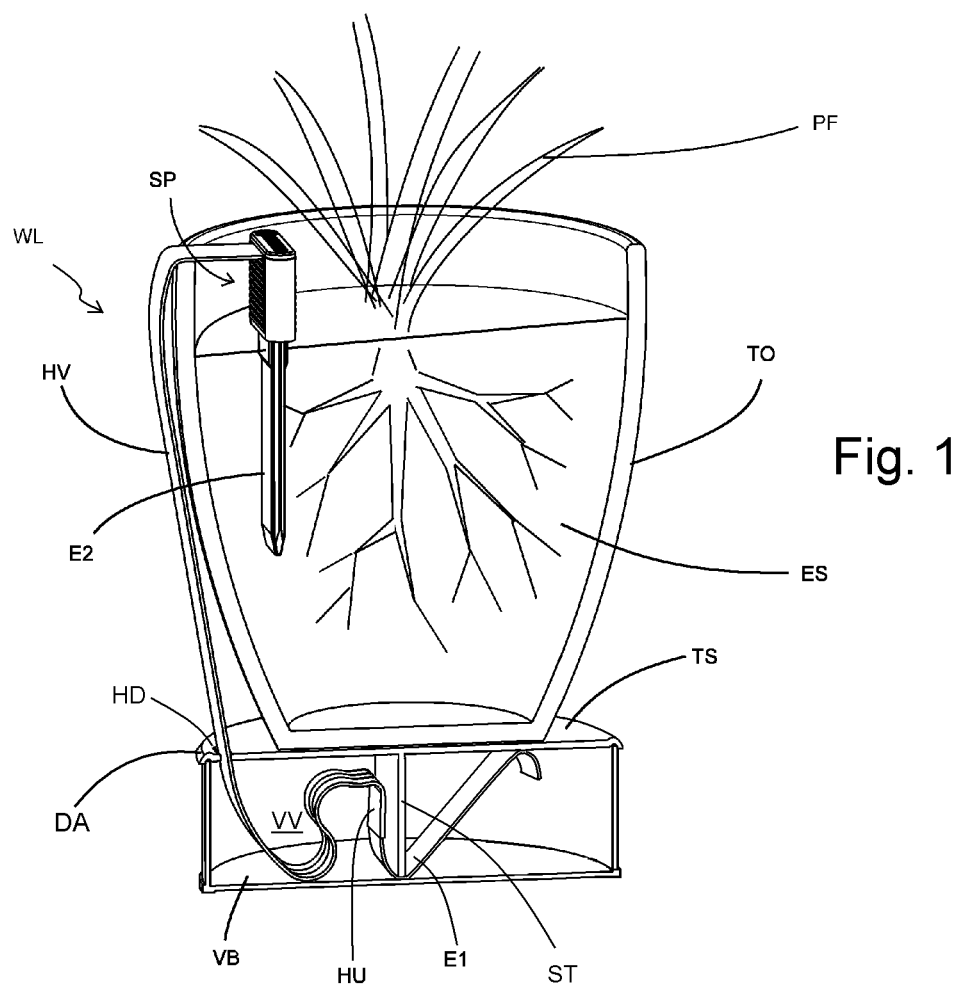

| | | | |
|---|---|---|---|
| 3,739,524 A * | 6/1973 | Rose | 47/81 |
| 3,758,987 A * | 9/1973 | Crane, Jr. | 47/80 |
| 4,083,146 A * | 4/1978 | Brankovic | 47/71 |
| 4,339,891 A | 7/1982 | Bassett | |
| 4,389,815 A | 6/1983 | English et al. | |
| 4,430,829 A | 2/1984 | Zeltner et al. | |
| 4,502,288 A | 3/1985 | Lynch | |
| 4,741,125 A | 5/1988 | Demorest | |
| 4,782,627 A | 11/1988 | Hauk | |
| 4,932,159 A | 6/1990 | Holtkamp, Sr. | |
| 4,965,963 A * | 10/1990 | Lyon | 47/81 |
| 4,999,947 A * | 3/1991 | Whitaker | 47/81 |
| 5,046,282 A | 9/1991 | Whitaker | |
| 5,111,614 A * | 5/1992 | Holtkamp, Sr. | 47/81 |
| 5,193,305 A | 3/1993 | Holtkamp, Jr. | |
| 5,329,729 A | 7/1994 | Liang | |
| 5,446,994 A * | 9/1995 | Chou | 47/81 |
| 5,782,035 A * | 7/1998 | Locke et al. | 47/79 |
| 5,956,899 A * | 9/1999 | DiOrio | 47/80 |
| 6,131,334 A | 10/2000 | Fan | |
| 6,675,533 B2 * | 1/2004 | Morlier et al. | 47/81 |
| 6,736,337 B2 * | 5/2004 | Vildibill et al. | 239/542 |
| 2009/0223124 A1 * | 9/2009 | Pasquariello et al. | 47/66.1 |
| 2011/0036007 A1 | 2/2011 | Oates | |

OTHER PUBLICATIONS

Chapter II International Preliminary Report on Patentability of PCT/EP2011/070295 mailed Jun. 6, 2013.

* cited by examiner

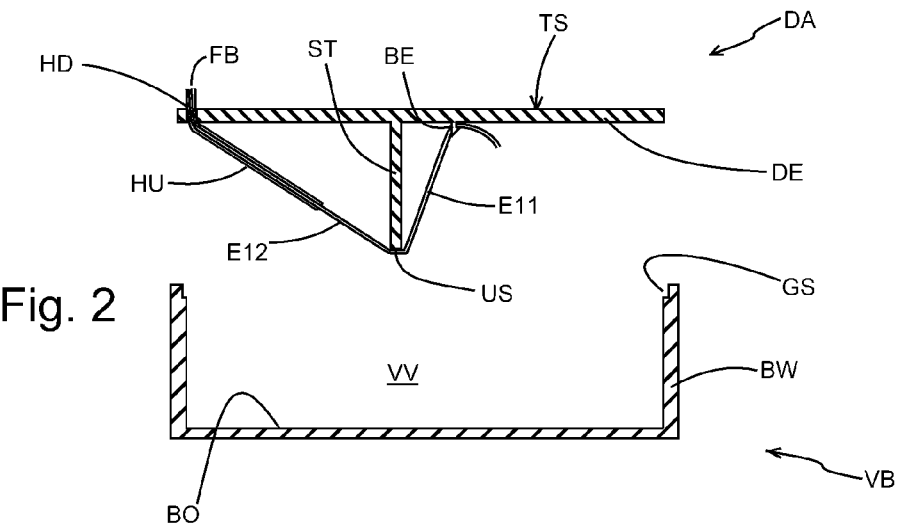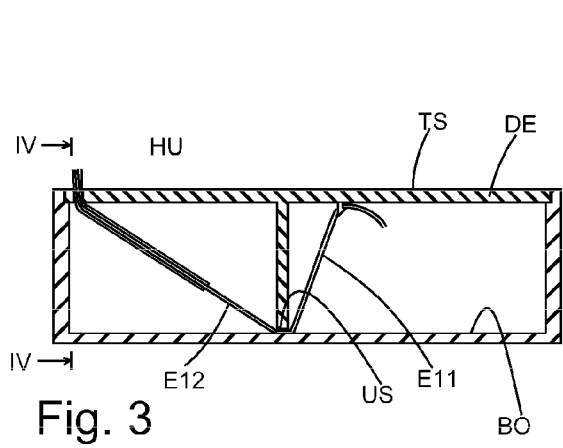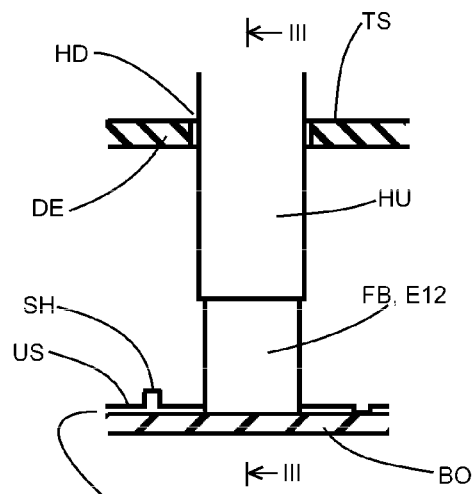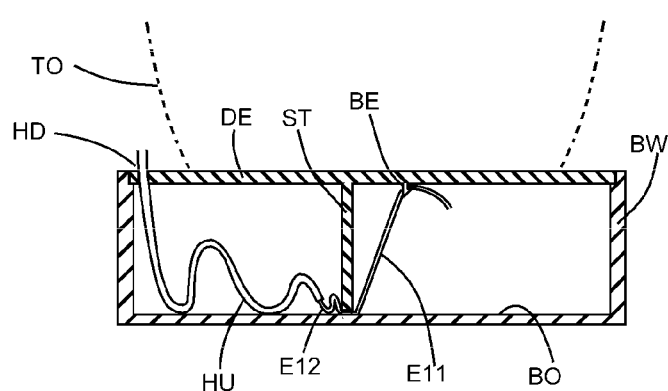

WATERING DEVICE

The invention relates to a watering device for potted plants with a water transporting line that uses capillary action.

Water transporting lines made of a fibrous material for watering potted plants have been known for a long time for watering potted plants. These lines transport water through capillary action out of a storage tank and into a plant substrate in a plant container at a higher elevation, against the force of gravity, and dispense the water in metered form to the plant substrate.

In the simplest embodiment, such water transporting lines are made of woolen fibers or other fiber strands of household materials, which may also be surrounded by watertight guide casings.

More complex embodiments of watering devices typically have a water storage tank with a lid that forms a pot utility surface. The water transporting line may lead out of this through an opening in the water storage tank and then over the edge of the pot of the potted plant to the plant substrate.

In addition to the fibrous water transporting lines, embodiments in which the fibrous material forms a fiber strand are also known.

In the systems known from GB 2,198,324 A or U.S. Pat. No. 6,131,334, wicks are held on supports protruding upward from the bottom of a water reservoir and are suspended at their ends in the water reservoir.

US 2011/0036007 A1 discloses a water system, in which a storage tank is rigidly connected to a ground spike and is secured at the side next to the plant pot with the ground spike inserted into a plant substrate in the plant pot. Water is transported out of the tank and into the plant substrate through a wick. There is a risk of overwatering because the water level in the storage tank is at approximately the same level as the ground spike.

With a system known from U.S. Pat. No. 4,782,627 having a storage tank suspended from a plant pot at the side, water is transported through a series connection of two water transporting lines at an adjustable flow rate.

Wick water systems with water storage tank beneath the plant substrate are best for meeting the need for watering. Such watering devices with water transporting line leading from the water storage tank at the side outside of the plant pot over the edge of the pot and into the plant substrate have an especially simple design and can be handled by the user in a manner that is easy to understand.

The object of the present invention is to provide such a potted plant watering device with advantageously simple and secure handleability.

The invention is described in the independent claim. The dependent claims contain advantageous embodiments and refinements of the invention.

The arrangement of a retaining device for the fiber strand of the water transporting line on the lid advantageously facilitates the handling of the lid arrangement and the water transporting line together with a plant pot standing on the lid arrangement, for example, when removing the lid arrangement from the water storage tank without having to release the second end, which is in contact with the plant substrate in the plant pot or the end protruding into the water tank.

In a preferred refinement, a fastening element to which the first end of the water transporting line can be attached in a pull-resistant manner is also provided on the water storage device, preferably on the lid arrangement, so that the line cannot be pulled completely out of the water storage device when there is inadvertent tension on a section of the water transporting line running outside of the water storage device.

Such a fastening element and its guidance of the water transporting line through the water storage device are advantageously disposed on opposite sides of the retaining device in the longitudinal course of the fiber strand. The guidance through the water storage device is preferably also formed on the lid arrangement, so that a water transporting line can especially advantageously be connected to the water storage device, since the water transporting line need be connected only to the lid arrangement independently of the water tank.

In a particularly advantageous embodiment, the retaining device is embodied as a retaining element having a lower edge facing the bottom of the water storage tank, such that, in the assembled state of the lid arrangement and the water storage tank, a passage for the water transporting line, in particular for the fiber strand, is formed from the lid arrangement and the water storage tank to the water storage device between the lower edges of the retaining element. On the one hand, particularly easy insertion of the fiber strand into the retaining device is possible in this way without threading it through a narrow opening, and on the other hand, retention of the fiber strand in the immediate vicinity of the bottom is ensured, so that the fiber strand can reliably absorb water from the water storage tank down to very low water levels in said water storage tank.

The water transporting line advantageously has a surrounding watertight tubular casing which is preferably also water-tight surrounding the fiber strand over its section running outside of the water storage device. On the first end of the water transporting line, the fiber strand is freed of the casing in a first end section, wherein the first end section extends from the fastening device over the retaining device and beyond, with the water transporting line running under tension on the lid arrangement, but the first end section comes to an end before the bushing through the lid arrangement, so that the fiber strand with the casing is preferably already present on the bushing.

The passage for the fiber strand between the lower edge of a retaining element of the retaining device and the bottom of the storage tank is advantageously of such dimensions that the fiber strand, optionally also being clamped, runs through the passage but the casing cannot be pushed through the passage. This prevents the casing from slipping through the passage and raising the first end section of the fiber strand, which is lying there freely, up from the bottom of the water storage tank above the water level in the water storage tank in a preferred embodiment, in which the water storage device has a stowage space for a length of the water transporting line that is not needed outside of the water storage device. Even in such a preferred embodiment, this also ensures reliable contact of the freely exposed fiber strand with the water in the water storage tank. In an advantageous embodiment, the stowage space for the unneeded length of the water transporting line is limited to a portion of the interior space of the water storage device. In particular the lower edge of the retaining element may be provided on a lower edge of a partition. The fiber strand is preferably designed in the form of a strand, wherein two or more layers may be situated one above the other. The passage between the lower edge of the retaining element and the bottom of the water storage advantageously forms a gap of a small height parallel to the bottom for such a fiber strand.

The invention is illustrated in greater detail below on the basis of preferred exemplary embodiments with reference to the figures, which show:

FIG. 1 a section through a watering device together with the plant pot,

FIG. 2 a watering device with the flow-through arrangement raised,

FIG. 3 a watering device after being assembled,

FIG. 4 a view according to IV-IV of FIG. 3,

FIG. 5 the watering device according to FIG. 3 with the water transporting line partially inserted.

FIG. 1 shows a partially sectional view of a potted plant watering device, which includes a plant pot TO having a plant PF with roots in a plant substrate ES. The plant pot TO is placed on a utility surface TS of the lid of a water storage tank. The water storage device has a storage volume VV in a pot-shaped storage tank VB. The storage tank VB is covered by a lid arrangement DA. A water transporting line WL is guided through a bushing HD in the lid arrangement DA, out of the storage volume VV and to a ground spike SP which is inserted together with a tip into the plant substrate ES. The water transporting line WL includes in particular a watertight and preferably also vapor-proof casing HU and, inside of this, namely a fiber strand in the example illustrated here, which is lengthened at both ends beyond the casing HU and which transports water on the basis of capillary action against the force of gravity and is in contact at its first exposed end E1 with water in the storage tank VB to absorb water, and at a second exposed end E2 is in contact with the plant substrate ES at the ground spike to release water to the plant substrate. Through a web ST protruding downward from the utility surface TS of the lid arrangement DA into the storage volume VV, it is ensured that at least one portion of the exposed first end E1 of the fiber strand will still be in contact with water even when there is a low water level in the storage tank.

The casing HU advantageously extends in the longitudinal direction of the water transporting line WL as far as the end of the ground spike SP, where it is secured mechanically, for example, being clamped, such that the clamping is of a type to hold the casing HU tightly on the ground spike SP but without having any negative effect on the transport of water through the fiber strand. The connection of the casing HU to the ground spike SP is preferably such that the ground spike SP with an insertion opening for this casing HU forms a defined alignment of the ground spike in relation to the upper edge of the plant pot TO.

FIG. 2 shows a water storage device having a storage tank VB and a lid arrangement DA, wherein the lid arrangement DA is separated from the storage tank VB. The situation according to FIG. 2 typically occurs when a water transporting line is brought for the first time into its operating position on the lid arrangement DA or when the lid arrangement DA is removed from the storage tank VB for cleaning purposes, for example, and then put in position again.

A web ST, as a retaining element of a retaining device on the lid arrangement DA, preferably runs perpendicular to the plane of the drawing in FIG. 2, extending further downward from a lid panel than the width of the strip-shaped water transporting line. The web ST in particular may also form a partition in the storage tank. The lid arrangement DA is already shown in FIG. 2 in its correct orientation in relation to the storage tank VB and is lowered downward for joining it to the storage tank VB.

In the case of the lid arrangement DA released from the storage tank VB, the underside of the lid arrangement DA is accessible for the user and the first end E1 of the fiber strand of the water transporting line can advantageously be attached to a fastening element BE. The first end of the fiber strand, which is labeled as E1 in FIG. 1, is subdivided in FIG. 2 into two end sections E11 and E12 which run on opposing sides of the retaining element ST. The bushing HD for the water transporting line through the lid panel DE of the lid arrangement is therefore also disposed on the side of the retaining element ST which is opposite the fastening element BE, and the fiber strand is guided over a lower edge US of the retaining element ST. In an advantageous and simple embodiment, for example, the fastening element BE may be an element which protrudes from the bottom of the lid panel DE and has an undercut, for example, in the form of a hook passing through the fiber strand. The fastening element BE may also be disposed in another position on the over arrangement, for example, on an elevated position of the retaining element ST.

In the situation illustrated in FIG. 2, the water transporting line is passed together with the section surrounded by a waterproof casing HU through the bushing HD in the lid panel DE and is put under tension in its path beneath the lid panel DE, so that a definite positioning of the water transporting line in its path beneath the lid panel DE is ensured.

The casing HU may advantageously have a small excess dimension in comparison with the bushing HD in one dimension, for example, in the direction of the surface normal to the strip shape of the water transporting line so that the water transporting line is automatically held in the taut position illustrated in FIG. 2 and the user has both ends free to lower the lid arrangement DA in the correct position into the storage tank VB and to position it there. In lowering the lid arrangement DA, the elements disposed beneath the lid arrangement DE, i.e., in particular the retaining element ST and the section of the water transporting line running beneath the lid panel DE, enter into the storage volume VV of the storage tank VB. The storage volume VV is bordered by the side walls BW and the bottom BO of the storage tank VB and is open at the top. Between the lid arrangement DA and the storage tank VB, corresponding structures which ensure in a form-fitting manner a horizontally and vertically defined relative position of lid arrangement DA and the storage tank VB in the condition of storage tank VB and lid arrangement DA in which they are joined together to the water storage device. FIG. 2 shows a step GS in the tank walls BW as a simple embodiment. A number of embodiments are conceivable for a form-locking means of securing a position between the lid arrangement DA and the storage tank VB. The lid panel DE in particular may also extend beyond the top edges of the side walls BW of the water storage tank VB.

FIG. 3 shows the situation after lowering the lid arrangement onto the storage tank VB. The lid panel DE is secured in position within the structures labeled as GS in FIG. 2 and is secured there vertically and horizontally. The lower edge US of the retaining element ST secures the fiber strand between the strand sections E11 and E12 in the immediate vicinity of the bottom BO of the water storage tank. For the sake of simplicity, the bottom BO in the example diagramed here is represented as a planar surface but it may also be designed to be nonplanar. In particular the section of the bottom on which the fiber strand is held by the retaining element between the sections E11 and E12 may form a bottom recess, in which the last residues of water can collect and be absorbed by the fiber strand. In the opposite embodiment, the bottom area on which the fiber strand is secured by the retaining element may also be slightly elevated in relation to one or more of the lowest positions of the bottom BO, so that any dirty components of the water will preferably collect in the recessed locations, and the region where the lower edge US of the retaining element holds the fiber strand at the bottom remains free of such soiling.

FIG. 4 shows a view of the situation according to FIG. 3 with a direction of view of a plane of intersection IV-IV according to FIG. 3. A preferred embodiment of the lower edge US of the retaining element ST is shown in this diagram, wherein the retaining element ST is assumed to be a partition extending beyond the width of the ribbon-shaped water transporting line, namely across the plane of the drawing in FIG. 3 and in the plane of the drawing in FIG. 4. In the preferred exemplary embodiment illustrated here, the lower edge US has an essentially straight course which follows the bottom surface BO of the water storage tank.

In particular in the region of the lower edge US of the retaining element in which the fiber strand is held by the retaining element a gap SP with respect to the bottom surface BO of the water storage tank is formed by the lower edge. The height of the gap SP is advantageously coordinated with the fiber strand and its watertight casing, so that the fiber strand can be passed through the gap SP beneath the elevated section SH of the lower edge US in its course between the end sections E11 and E12 without raising the recessed edge sections SL from the bottom but so that the casing HU cannot be pushed through the gap SP. The height of the gap SP may be reduced in comparison with the thickness of the fiber strand in its relaxed state so that the fiber strand is held by clamping it in the gap SP. Therefore there is no absorbency of the first end of the fiber strand for the transport to the second end of the fiber strand because the end section E12 can always absorb water and can transport it away unhindered through the fiber strand. The height of the gap SP may be on the order of 1 mm, for example. Through additional cutouts SH in the web ST protruding further upward from the bottom, trouble-free flow of water between various partial spaces of the storage tank is ensured even with a partition as the web ST passing through the storage volume VV.

After the water storage device has been assembled as depicted in FIG. 3 and FIG. 4, a plant pot TO can be placed on the utility surface TS of the lid arrangement as illustrated in FIG. 5. The size of the plant pot determines the required minimum length of the water transporting line outside of the water storage device to the ground spike illustrated in FIG. 1. A portion of the length of the water transporting line which is not needed outside of the water storage device can be inserted into the storage volume VV on its side of the retaining element ST facing the bushing HD by relative displacement of the casing HU in the bushing HD. The water transporting line assumes a path, optionally with possible deflections, in the partial volume between the retaining element ST and the bushing HD, as shown in FIG. 5. The dimensioning of the gap SP between the lower edge of the retaining element ST and the bottom B as described here reliably prevents the casing HU from being different due to the gap into the partial chamber of the storage volume of the water tank VB situated at the right in FIG. 5 and in the worst case the exposed end section of the fiber strand might be able to lift up from the bottom BO. Instead, the fully exposed fiber strand always remains in a region in which there is contact with the water supply even at low filling levels in the water storage tank. In drawing in FIG. 5, the end section E11 of the fiber strand is shown with no change in comparison with FIG. 3, but that is not regarded as being obligatory.

The water storage device expediently also has a filling device (not shown in the figures), for example, an opening with a protrusion in the side wall BW or a recess in the lid panel DE through which water can be added subsequently to the water storage tank without having to lift the lid arrangement away from the storage tank. Furthermore, a filling level display may be provided for the water tank, for example, in the form of a float or preferably in the form of an inspection window in the side wall BW through which the filling level can be checked without removing the lid arrangement.

The holding element ST may at the same time also form a mechanical stabilization of the lid panel DE to which a load is applied by the plant pot TO due to recessed lower edge sections protruding downward to the bottom BO contrary to the curve illustrated in FIG. 4. Support for the lid panel may also be provided by other supporting elements (not shown in the figures).

The features defined above and in the claims as well as the features that can be derived from the figures can be implemented advantageously either individually or in various combinations. The invention is not limited to the exemplary embodiments described here but instead can be modified in a variety of ways within the context of technical expertise.

The invention claimed is:

1. A watering device for potted plants with a water storage device and a water transporting line having a fiber strand which operates by capillary action, wherein
the water storage device comprises a storage tank which opens toward the top and a lid arrangement, which closes the storage tank in a removable manner,
a duct for the water transporting line is formed on the water storage device,
a retaining device which protrudes downward into the storage tank in the assembled state is provided on the lid arrangement, the retaining device guiding a section of the fiber strand in a bottom area of the storage tank,
wherein a fastening element for fixing the water transporting line in a tension-proof manner is provided on the lid arrangement, and wherein the fastening element is arranged on a side of the retaining device which faces away from the duct and is designed for fixing the fiber strand.

2. The watering device according to claim 1, wherein the water transporting line has a watertight casing around the fiber strand in a course outside of the duct of the water storage device.

3. The watering device according to claim 1, wherein the retaining device forms, together with a lower edge facing the bottom of the storage tank, a narrow passage for the fiber strand.

4. The watering device according to claim 2, wherein the passage is designed to be so narrow that only the fiber strand without a casing can be passed through the passage.

5. The watering device according to claim 3, wherein the passage forms a gap running parallel to the bottom.

6. The watering device according to claim 2, wherein the casing is displaceable in its longitudinal direction in relation to the duct, and the storage tank has a stowage space for the water transporting line.

7. The watering device according to claim 1, wherein the fiber strand is designed in the form of a strand.

8. The watering device according to claim 2, wherein the passage forms a gap running parallel to the bottom.

* * * * *